Patented June 23, 1942

2,287,510

UNITED STATES PATENT OFFICE 2,287,510

CYANOETHYLATED ARYLALIPHATIC KETONES

Herman A. Bruson, Philadelphia, Pa., assignor to The Resinous Products & Chemical Company, Philadelphia, Pa.

No Drawing. Original application April 19, 1941, Serial No. 389,332. Divided and this application June 24, 1941, Serial No. 399,504

11 Claims. (Cl. 260—465)

This invention relates to arylaliphatic ketones having at least two β-cyanoethyl radicals on a carbon atom adjacent to the carbonyl group.

This invention is a division of my copending application Serial No. 389,332, filed April 19, 1941.

According to this invention, acrylonitrile is reacted in the presence of an alkaline condensing agent with an arylaliphatic ketone having an active methylene or methyl radical contiguous to its carbonyl group, whereby two or three β-cyanoethyl radicals, respectively, are introduced in place of the hydrogen atoms of the methylene or methyl radical.

Among the alkaline condensing agents which have been found effective for promoting the reaction are the oxides, hydroxides, amides, and alcoholates of the alkali metals or the alkali metals themselves. There may also be used strongly basic non-metallic hydroxides, for example, quaternary ammonium hydroxides. Of these a particularly effective product is the aqueous solution containing 40% of trimethyl benzyl ammonium hydroxide which is available commercially under the trade name "Triton B". One or several of these materials are suspended or, preferably, dissolved in the ketone itself or in a solution of the ketone in an inert liquid, such as dioxane, ether, or benzene, or in a liquid which is less reactive than the reacting ketone, such as water, or tertiary butyl alcohol.

The reaction is applicable to a wide variety of monocyclic or polycyclic arylaliphatic ketones including saturated or unsaturated monoketones or polyketones. The ketones may contain other nuclear substituents than the carbonyl group so long as they do not readily destroy the alkaline condensing agent used. For example, these groups may be halogen, acyl, alkoxy, aryloxy, thioether, tertiary amino, sulfonyl, carbalkoxy, carbamyl, thiocyano, or hydrocarbon groups, etc.

Among the more readily available typical arylaliphatic ketones having two or more reactive hydrogen atoms on carbon contiguous to the carbonyl group, which are suitable for this invention may be mentioned the following:

Acetophenone, propiophenone, butyrophenone, valerophenone, stearophenone, methyl-β-naphthyl ketone, methyl-α-naphthyl ketone, p-acetyl diphenyl, dibenzyl ketone, desoxybenzoin, benzalacetophenone, 1,8-dibenzoyloctane, benzoyl acetic ester, p-methyl-acetophenone, p-methoxy-acetophenone, p-chloro-acetophenone, p-bromo-acetophenone, 2-acetyl tetrahydronaphthalene, 5-acetyl-acenaphthene, acetyl-p-cymene, 3-acetyl phenanthrene, 3-acetyl retene and their homologues.

The condensation takes place readily at temperatures from about 0° to about 80° C., although initial temperatures of 25° C. to 60° C. are preferred. The reaction is usually exothermal, so that cooling, at least during the early part of the condensation, is generally advantageous in order to control the vigor of the reaction and to prevent undesired polymerization or side reactions. In this connection it is sometimes desirable to add polymerization inhibitors, such as hydroquinone, α-naphthol, catechol, finely divided copper, or sulfur.

The quantity of alkaline condensing agent required is usually relatively small, amounts of the order of 1% to 10% on the combined weight of the reactants usually being sufficient. Since the condensation ceases if the alkali is depleted by side reactions or impurities of an acid nature in the starting materials, it is advantageous to test the reaction mixture for alkalinity toward red litmus from time to time during the condensation, and, if an alkaline reaction is no longer shown, to add more alkali to make up for the loss.

The poly-β-cyanoethylation products obtainable by the present process are all new compounds, the synthesis of which heretofore would have been extremely difficult and expensive. They may find use as intermediates for the preparation of polycarboxylic acids, amides, esters, amines, amidines, amino acids, cyano acids, amino alcohols, or thio-amides by the usual reactions characteristic of the nitrile group. Many of the compounds may find uses in diverse fields, including synthetic resins, artificial fibres, plastics, plasticizers, dyestuffs, pharmaceuticals, insecticides, textile finishing agents and other commercial applications.

The following examples illustrate this invention, it being understood that, although trimethyl benzyl ammonium hydroxide is the preferred alkaline condensing agent, others, such as sodium ethylate, potassium tertiary amylate, sodium methylate, potassium hydroxide, lithium hydroxide, sodamide, sodium metal, sodium hydride, sodium oxide, sodium hydroxide, tetramethyl ammonium hydroxide, tetraethanol ammonium hydroxide, benzyl triethyl ammonium hydroxide, dimethyl dibenzyl ammonium hydroxide, and other quaternary ammonium hydroxides, or other strong bases may be used.

Example 1

To a solution of 60 g. of acetophenone in 60 g.

of dioxane containing 5 g. of aqueous 40% trimethyl benzyl ammonium hydroxide solution was added 79.5 g. of acrylonitrile dropwise during two hours while the mixture was stirred and maintained between 30° and 40° C. by external cooling. During the addition, crystals began to separate. After the acrylonitrile had been added, the mixture was stirred one hour longer and filtered. There was obtained 79 g. of pinkish crystals which upon recrystallization from glycol monoethyl ether ("Cellosolve") formed colorless needles melting at 128–129° C., the analysis of which indicated the compound to be tri-(β-cyanoethyl)methyl phenyl ketone having the formula

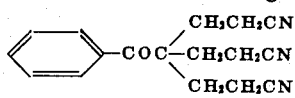

Upon hydrolysis with an excess of boiling potassium hydroxide solution and acidification of the solution, the above compound yields the corresponding tricarboxylic acid $C_6H_5COC(CH_2CH_2COOH)_3$ in the form of colorless crystals melting at 142–145° C. with decomposition.

Example 2

To a solution of 34 g. of methyl-2-naphthyl ketone in 100 cc. of dioxane and 2 g. of aqueous 38% trimethyl benzyl ammonium hydroxide there was added dropwise 31.8 g. of acrylonitrile during 35 minutes while the reaction mixture was stirred and maintained between 20° and 35° C. by means of external cooling. The mixture was then stirred four hours longer at room temperature. The dark solution was acidified with dilute hydrochloric acid, poured into two liters of water and the yellowish viscous oil separated by taking it up in ethylene dichloride and washing the solution thoroughly with water. Upon evaporation of the ethylene dichloride under reduced pressure on a steam bath there was obtained a reddish viscous syrup weighing 64 g. Upon the addition of 200 cc. of ethanol the mixture crystallized. After recrystallization from hot ethanol the product separated in colorless large plates melting at 122° C. The compound contains three cyanoethyl radicals and has the formula

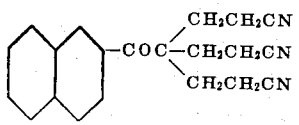

Example 3

To a solution of 37.2 g. of p-acetyl diphenyl in 150 g. of dioxane and 4 g. of aqueous 38% trimethyl benzyl ammonium hydroxide there was added dropwise 31.8 g. of acrylonitrile during 30 minutes while the reaction mixture was stirred and maintained at 35–40° C. by external cooling. After the mixture was stirred for two hours longer at room temperature, it became crystalline. The crystals were filtered off and washed with a little dioxane, resulting in a yield of 32 g. of white crystals. After recrystallization from dioxane, tri-(β-cyanoethyl)-acetyldiphenyl having the formula

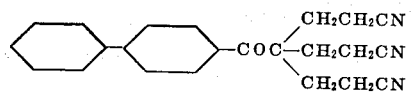

was obtained in the form of colorless plates melting at 178° C.

In place of acetyl diphenyl, one may use other acetylated polynuclear aromatic hydrocarbons such as acetyl-anthracene, acetyl-phenanthrene, acetyl-retene, and the like to obtain the corresponding tri-cyanoethylated derivatives in the manner indicated above.

Example 4

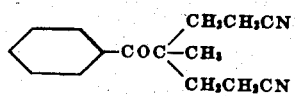

To a solution consisting of 26.9 g. of propiophenone (0.2 mol), 50 g. of dioxane and 2 g. of aqueous 38% trimethyl benzyl ammonium hydroxide there was added dropwise 21.2 g. of acrylonitrile (0.4 mol) during 20 minutes, while the reaction mixture was stirred and maintained between 25° and 32° C. by external cooling. The mixture was stirred for an additional five hours at 25° C., then acidified with dilute hydrochloric acid, and poured into 300 cc. of water. The oil layer was separated, taken up in ethylene dichloride, washed thoroughly with water, and the ethylene dichloride layer evaporated off on a steam bath under reduced pressure. The residual oil weighed 48 g. It was mixed with an equal weight of ethanol and chilled, whereupon the product crystallized. After recrystallization from ethanol, the di-(β-cyanoethyl)-propiophenone formed colorless crystals melting at 66° C.

In place of propiophenone, its homologues such as butyrophenone, stearophenone or its nuclear alkyl, aryl, aralkyl, cycloalkyl, nitro, halogen, alkoxy, or aryloxy derivatives may be used to obtain the corresponding di-cyanoethylated derivatives in the manner indicated above.

Example 5

Acrylonitrile (10.6 g.) was added dropwise during 15 minutes to a stirred solution of 70 g. of dioxane, 16.1 g. of 1,8-dibenzoyl-octane, and 2 g. of aqueous 40% trimethyl benzyl ammonium hydroxide while the reaction mixture was maintained at 37–45° C. by external cooling. The mixture was then stirred four hours longer at 25–30° C. and then stirred with water containing sufficient hydrochloric acid to neutralize the alkali. The oil was taken up in ethylene dichloride, the oil layer separated, washed, and concentrated under reduced pressure on a steam bath until all the solvent was removed. The residual oil weighing 26 g. was redissolved in benzene, filtered to remove traces of polymer and the benzene removed by evaporation in vacuo at 80–90° C. The final product was a viscous reddish oil. Its analysis indicated that it consisted essentially of tetra-(cyanoethyl)-dibenzoyl octane having the probable formula

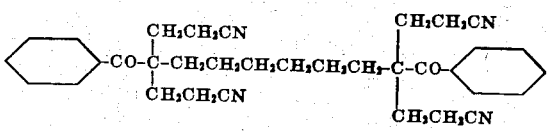

Example 6

Acrylonitrile (21.2 g.) was added dropwise during 40 minutes to a mixture of 21 g. of bibenzyl ketone, 50 g. of dioxane and 2 g. of aqueous 38% trimethyl benzyl ammonium hydroxide at 30–35° C. while the mixture was stirred. The mixture was allowed to stand 18 hours at 25° C. It was then neutralized with dilute hydrochloric acid and taken up in ethylene dichloride. The solution was washed with water and evaporated to dryness in vacuo on a steam bath. The residue was a viscous sticky syrup weighing 42 g. consisting essentially of the tetra-cyanoethylation product

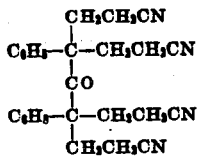

It was soluble in methanol.

Example 7

To a solution of 30 g. of p-methoxyacetophenone, 50 g. of dioxane, and 2 g. of 38% trimethyl benzyl ammonium hydroxide, there was added dropwise while the mixture was stirred 31.8 g. of acrylonitrile at a temperature of 35° C. After the mixture was stirred for several hours at 25° C., dilute hydrochloric acid was added until it was acid to litmus. The product was mixed with ethylene dichloride and then washed with water. The ethylene dichloride layer was evaporated to dryness under reduced pressure on a steam bath. The residual oil, weighing 56 g. became crystalline when stirred with a little methanol. The product, after recrystallization from methanol, separated in colorless needles melting at 133° C., having the formula

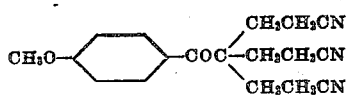

In the same manner the p-ethoxy, p-phenoxy and p-benzyloxy derivatives may be prepared from the corresponding p-substituted acetophenones.

Example 8

Acrylonitrile (31.8 g.) was added dropwise during the course of thirty minutes to a stirred solution consisting of 30.9 g. of p-chloro-acetophenone, 50 g. of dioxane, and 2 g. of aqueous 38% trimethyl benzyl ammonium hydroxide while the reaction mixture was cooled to 32-37° C. The product began to crystallize out at the end of this time. After standing 18 hours, the mixture was neutralized with dilute hydrochloric acid and the crystals filtered off. The yield was 39 g. Upon recrystallization from methanol the product formed colorless stout needles melting at 141-142° C. having the formula

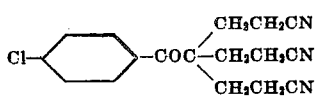

The original filtrate upon evaporation yielded 25 g. of viscous oil containing lower cyanoethylated products.

Example 9

21.2 g. of acrylonitrile was added dropwise during 15 minutes to a stirred solution of 27 g. of p-bromo-acetophenone, 50 g. of dioxane, and 2 g. of aqueous 38% trimethyl benzyl ammonium hydroxide while the reaction mixture was maintained between 30° and 40° C. The solution was then stirred for 24 hours at 25° C., acidified with dilute hydrochloric acid, mixed with 50 cc. of ethylene dichloride and the crystals filtered off. The yield was 23 g. After recrystallization from ethanol, the product formed colorless needles melting at 151-152° C., having the formula

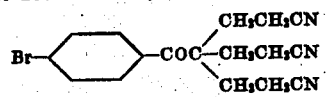

More of the above product can be recovered from the filtrate by evaporation and trituration with ethanol.

Example 10

31.8 g. of acrylonitrile was added dropwise during 25 minutes to a stirred solution consisting of 26.8 g. of p-methyl acetophenone, 50 g. of dioxane, and 2 g. of aqueous 38% trimethyl benzyl ammonium hydroxide, at 33-37° C. After the mixture had stood 48 hours, it was neutralized with dilute hydrochloric acid and the crystalline product filtered off. The yield was 25 g. After recrystallization from ethanol, it formed colorless needles melting at 161-162° C. having the formula

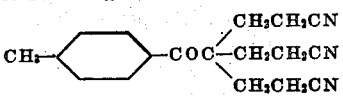

The filtrate contains a further quantity of this product.

Example 11

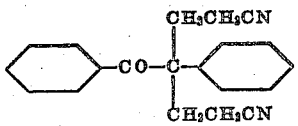

Acrylonitrile (13.5 g.) was added dropwise to a stirred solution of 50 g. of dioxane, 25 g. of desoxybenzoin, and 2 g. of aqueous 40% trimethyl benzyl ammonium hydroxide while the reaction temperature was maintained between 30° and 36° C. by external cooling. After all of the acrylonitrile had been added, the mixture was stirred for three hours at 45° C. to complete the reaction. It was then cooled, acidified with dilute hydrochloric acid, taken up in ethylene dichloride and washed thoroughly with water. The ethylene dichloride layer was evaporated to dryness under reduced pressure on a steam bath and the residual crystalline product weighing 38 g. washed with a little alcohol and purified by recrystallization from ethyl alcohol. The di - β - cyanoethyl) - desoxybenzoin formed colorless needles melting at 149-150° C. The yield of pure product was 30 g.

While the di- and tri-β-cyanoethyl derivatives of the arylaliphatic ketones are of greatest interest since they and their derivatives are new compounds of particular value, the reaction of acrylonitrile in the presence of an alkylene condensing agent is also applicable to the less common ketones having a methenyl group contiguous to the carbonyl group, such as $C_6H_5COCH(R)_2$, where R is a hydrocarbon group. In such cases only one β-cyanoethyl group will be introduced.

I claim:

1. As a new compound, an arylaliphatic ketone having a plurality of β-cyanoethyl radicals on an aliphatic carbon atom contiguous to the carbonyl group.

2. As a new compound, an arylaliphatic ketone having three β-cyanoethyl radicals on an aliphatic carbon atom contiguous to the carbonyl group.

3. As a new compound, an arylaliphatic ketone having two β-cyanoethyl radicals on an aliphatic carbon atom contiguous to the carbonyl group.

4. As a new compound, tri-(β-cyanoethyl)-acetophenone having the formula

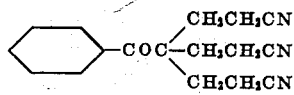

5. As a new compound, di-(β-cyanoethyl)-propiophenone having the formula

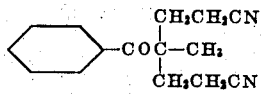

6. As a new compound tri-(β-cyanoethyl)-p-methyl acetophenone having the formula

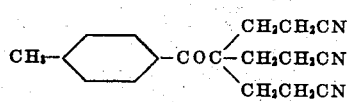

7. A process for introducing a β-cyanoethyl group on an aliphatic carbon atom of an arylaliphatic ketone which comprises condensing acrylonitrile in the presence of an alkaline condensing agent with an arylaliphatic ketone having a hydrogen atom attached to an aliphatic carbon atom contiguous to the ketonic carbonyl group.

8. A process for introducing at least two —CH₂CH₂CN groups on an aliphatic carbon atom of an arylaliphatic ketone which comprises condensing acrylonitrile in the presence of an alkaline condensing agent with an arylaliphatic ketone having at least two hydrogen atoms attached to an aliphatic carbon atom contiguous to the ketonic carbonyl group.

9. A process for introducing at least two —CH₂CH₂CN groups on an aliphatic carbon atom of an arylaliphatic ketone which comprises condensing arcylonitrile in the presence of a strongly basic quaternary ammonium hydroxide with an arylaliphatic ketone having at least two hydrogen atoms attached to an aliphatic carbon atom contiguous to the ketonic carbonyl group.

10. The process of claim 9 in which the quaternary ammonium hydroxide is benzyl trimethyl ammonium hydroxide.

11. A process for introducing three β-cyanoethyl groups on a carbon atom of an arylaliphatic ketone having a methyl group contiguous to its carbonyl group, which comprises condensing said ketone with acrylonitrile in the presence of an alkaline condensing agent.

HERMAN A. BRUSON.